US012760701B2

(12) United States Patent
Arseneau

(10) Patent No.: US 12,760,701 B2
(45) Date of Patent: *Oct. 13, 2026

(54) FUEL INJECTOR TESTING MACHINE

(71) Applicant: Paul Arseneau, Fort Worth, TX (US)

(72) Inventor: Paul Arseneau, Fort Worth, TX (US)

( * ) Notice: Subject to any disclaimer, the term of this patent is extended or adjusted under 35 U.S.C. 154(b) by 472 days.

This patent is subject to a terminal disclaimer.

(21) Appl. No.: 18/352,441

(22) Filed: Jul. 14, 2023

(65) Prior Publication Data

US 2023/0358198 A1 Nov. 9, 2023

Related U.S. Application Data

(63) Continuation of application No. 17/466,011, filed on Sep. 3, 2021, now Pat. No. 11,703,023.

(60) Provisional application No. 63/074,401, filed on Sep. 3, 2020.

(51) Int. Cl.
*F02M 65/00* (2006.01)
*G01K 13/00* (2021.01)

(52) U.S. Cl.
CPC .......... *F02M 65/00* (2013.01); *F02M 65/001* (2013.01); *G01K 13/00* (2013.01); *F02M 2200/85* (2013.01); *F02M 2200/853* (2013.01)

(58) Field of Classification Search
CPC ...................................................... F02M 65/00
See application file for complete search history.

(56) References Cited

U.S. PATENT DOCUMENTS

| | | | | |
|---|---|---|---|---|
| 4,569,227 | A * | 2/1986 | Adolph | F02M 65/002 73/1.26 |
| 5,000,043 | A * | 3/1991 | Bunch, Jr. | F02M 65/00 73/114.46 |
| 5,482,626 | A * | 1/1996 | Lohnes | G01N 1/4077 210/328 |
| 6,234,002 | B1 * | 5/2001 | Sisney | F02M 65/001 73/116.04 |
| 2005/0034514 | A1 | 2/2005 | Shen | |
| 2005/0172705 | A1 | 8/2005 | Palazzolo | |
| 2009/0114035 | A1 | 5/2009 | Lehnert | |
| 2010/0170329 | A1 | 7/2010 | Greeves | |
| 2013/0031775 | A1 | 2/2013 | Cueto | |
| 2020/0340439 | A1 * | 10/2020 | Jacobs | F02M 65/00 |
| 2021/0008699 | A1 * | 1/2021 | Moulton | B25B 9/02 |

* cited by examiner

*Primary Examiner* — Eric S. McCall
(74) *Attorney, Agent, or Firm* — Lambert Shortell & Connaughton; David J. Connaughton, Jr.; Justin P. Tinger

(57) ABSTRACT

A fuel injector testing machine is provided. The machine includes a head unit having a flow meter, and a fuel injector holding assembly. The head unit and/or the fuel injector holding assembly can be moved relative to each other, allowing the head unit to test a subset of fuel injectors held on the fuel injector holding assembly, and subsequently can test another subset of the fuel injectors via movement of the head unit and/or fuel injector holding assembly.

20 Claims, 7 Drawing Sheets

FUEL INJECTOR TESTING MACHINE

BACKGROUND

Technical Field

The present disclosure relates generally to testing machines. More particularly the present disclosure relates to a machine to efficiently and effectively test fuel injectors.

Description of Related Art

Testing of flow and operational parameters of fuel injectors is important to ensure operability. This testing is also useful when optimizing engine performance to ensure that ideal and uniform operation is occurring across all cylinders of an engine.

Systems exist which test multiple injectors by spraying a fluid through the injector into a graduated cylinder. A user must then manually review the amount of fluid and record the results. Such systems also are generally limited to only 8 injectors to be tested at a time. A user must also manually replace the injectors to test more. Thus, these systems are time and labor intensive operations requiring a technician to constantly record, monitor, and operate the machine.

Other systems exists which utilize a single flow meter to test a single fuel injector. A single injector is tested and then manually replaced in this system—again a time intensive process which requires constant monitoring by a technician. The flow meter allows computerized tracking of the fluid flow, but such flow meters are highly expensive. A multi-injector version of such a machine would be prohibitively expensive due to the need for multiple flow sensors, multiple fuel pumps, additional data acquisition hardware, and the like.

Therefore, what is needed is a machine which can more efficiently test fuel injectors.

DETAILED DESCRIPTION

Figure 1A:
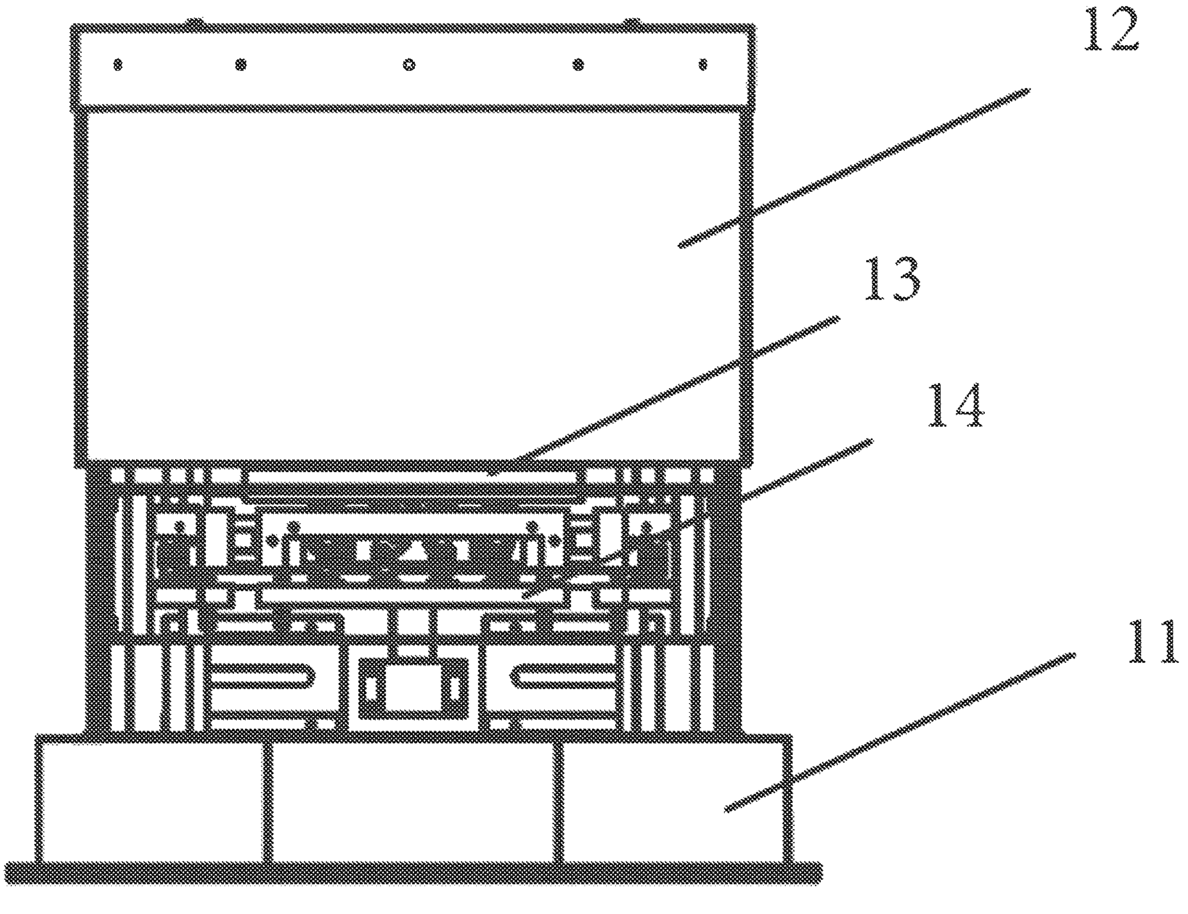
FIG. 1A provides a frontal view of an embodiment of the fuel injector testing machine.

The detailed description set forth below in connection with the appended drawings is intended as a description of presently preferred embodiments of the invention and does not represent the only forms in which the present disclosure may be constructed and/or utilized. The description sets forth the functions and the sequence of steps for constructing and operating the invention in connection with the illustrated embodiments.

Generally, the present disclosure concerns a fuel injector testing machine comprised of testing components, a testing head unit, and a carousel, conveyor, or linear rack or assembly for holding fuel injectors. Testing components of the machine include components such as a fluid reservoir(s), pump, pressure and temperature gauges, a fluid heater, a fluid chiller, damping accumulators, and computerized controller. The testing head unit is formed of a manifold which receives a fluid inlet from e.g. a hose and splits flow to one or more flow meters. At an outlet of the manifold is at least one connector (the same as the number of flow meters) such as a fitting sized and configured to mate with a matching connector fitting of the fuel injector holding assembly (carousel, conveyor, rack, etc.). The head unit and assembly are separable from each other using an automated control, in most embodiments an inward and outward movement. The head unit and assembly are also movable with respect to each other, either by movement of the head unit, movement of the assembly, or both, so that additional fuel injectors can be tested by the head unit. Typically, movement is controlled by a motor, CNC machine or CNC-type control, hydraulics, and the like. Thus, the machine can test multiple fuel injectors using automated control by testing a subset of the injectors, moving the configuration, and testing another subset of the injectors, continuing on until all injectors are tested.

The testing machine, by testing only a subset of the total fuel injectors to be tested, and moving along the group of injectors to be tested, reduces cost because fewer expensive components, especially flow meters, are needed. Further, the machine can be largely automated, requiring substantially less attention, intervention, and handling by a human operator. The machine can be programmed, set, and then left alone until it completes the testing, reducing the amount of time and attention needed by an operator.

Embodiments of the present invention disclosed herein will largely use the term "carousel" to describe the injector holding assembly. However, it should be understood that this carousel may take other shapes and configurations such as a linear assembly having multiple fuel injector slots to hold multiple fuel injectors. In another embodiment, the assembly may be a conveyor which moves relative to the head unit in a continuous shape. On one side of the conveyor, injectors for testing can be added and removed as testing proceeds. Indeed, any assembly may be used which has a body and multiple slots or regions to hold a fuel injector such that it may be moved relative to the head unit for testing. The carousel can be manually loaded in one embodiment. In another embodiment, the carousel may be loaded automatically for continuous or extended usage using a mechanized loading system. In differing embodiments of the machine, the injector holding assembly may move while the head unit stays fixed in place, or the head unit may move while the injector holding assembly is fixed in place, or both may move.

The testing machine disclosed herein, in most embodiments, is programmed and operable to carry out testing as set forth in SAE J1832 (February 2001) which is incorporated herein in its entirety. Of course, in other modes of testing may be employed without straying from the scope of this invention.

The head unit of the testing machine is formed generally of a body which can receive a tubing or hose for conveying test fluid, as well as a flow meter in fluid communication with the hose. In many embodiments the head unit has a manifold downstream of the hose or tubing which splits flow therefrom into one or more flow outlets. A flow meter is positioned in fluid communication with each flow outlet so as to measure flow through each individual outlet. The body of the head unit further has one or more connectors for mating engagement with corresponding connectors on the carousel. The connectors may be the connection points on a fuel injector directly, or a separate connector on the carousel itself which in turn may engage with the fuel injector. Generally the connector of the head unit is formed as a protrusion having an optional O-ring or gasket to engage with a corresponding recession in or on the carousel assembly or a receiving port on the fuel injector itself. In another embodiment, the connector may be a recession port of the body configured to mate with a protrusion port in or on the carousel. Of course, other configurations may be employed without straying from the scope of this invention.

The head unit may be fixedly connected in place, or may be movable so as to move relative to the carousel to test multiple sets of fuel injectors on the carousel. In one embodiment, the head unit may move in reciprocating motion to engage and disengage with fuel injectors on the carousel. In such an embodiment, movement may be controlled using a motor, piston, and the like. In a particular embodiment, movement may be controlled by a motor and lead screw. Of course, any other movement configuration is also possible without straying from the scope of the invention. In some embodiments, the head unit may comprise additional testing components including, but not limited to temperature sensors, pressure transducers, control valves, a fluid heater, a fluid chiller, a pump, and the like. In other embodiments, some or all of these may be housed in or on the testing machine body.

The carousel may be any polygon shape or a circle. In other embodiments, as noted above, the injector holding assembly may also be linear, formed as a conveyor, among other options. In many cases, the carousel may be a polygon shape such as a hexagon, octagon, and the like. In one embodiment, on each face of the polygon, a cartridge for holding fuel injectors may be removably attached. The cartridge body contains at least one connector corresponding to each connector of the head unit. This connector is in fluid communication with a fuel injector positioned within the cartridge and thus when the head unit is connected to the cartridge, fluid may flow through the fuel injector when it is in an open position. In another embodiment, the carousel itself may define slots for the fuel injector(s) on each face or surface, as well as having a connector to mate with the head unit in fluid communication with the fuel injector slot. In an embodiment having a circular carousel, the head unit may have connectors positioned on a radius of curvature matching the circular carousel, or the head unit may have only one connector and testing flow meter as is possible in other embodiments too.

In one embodiment, each face of the carousel may hold, or have a cartridge which holds, four fuel injectors. In such an embodiment, typically the head unit will also have a matching number (four) of connectors, and four flow meters, each aligned with one of the connectors to measure flow through each one of the four fuel injectors. Once testing is completed, one of the carousel or head unit (or both) may move to access another set of four fuel injectors loaded on the carousel. Testing may proceed on these four, and then the process continues automatically using the machine and its programmed controllers and components, until all desired fuel injectors have been tested. Of course, in other embodiments different numbers of fuel injectors and head unit connectors and flow meters may be used without straying from the scope of this invention. Of course, other numbers of injectors may be held on the carousel and/or cartridge without straying from the scope of this invention.

The machine includes a computer which records and saves all testing results and test parameters for review and further processing. In certain embodiments, the computer may be programmed to automatically identify and group fuel injectors having similar or the closest flow parameters and present this as an output to users. The computer may also be programmed to control actuation of solenoid valves of each fuel injector, in some embodiments. In other embodiments, as noted below, physical modules may be connected to the machine via an electrical connector port in communication with the machine to control the firing of the injectors.

In most embodiments, a reservoir may be positioned in communication with an outlet of the fuel injectors on the carousel. The reservoir catches the fluid sprayed through the injectors and can, in some embodiments, direct fluid back to the fluid pump to recycle the fluid for repeated usage. Accordingly, a hydraulic circuit for the system as a hole is completed with the reservoir, a pump, tubing and flow path, flow meters, and damping accumulators.

Fluid for testing the fuel injectors may be any fluid which can pass through the fuel injectors. Typically heptane is a preferred fluid, but gasoline and any other fluid having suitable flow properties may be used without straying from the scope of this invention. The fluid is stored in a reservoir of a body of the machine. The temperature of this fluid may be adjusted in certain embodiments so as to adjust test parameters. A pump is in communication with the reservoir and can provide fluid to the head unit via a hose/piping and the like. In one embodiment, multiple pumps may be used, and in a particular embodiment, each flow meter of the head unit may be connected to its own pump. A pressure of the fluid conveyed by the pump is adjustable using a physical or electronic controller and is measurable by a pressure gauge, again either physical or electronic. Typically, the system will operate at pressures below 120 psi, but the system is not necessarily limited to this maximum pressure. Adjustment of pressure (and temperature) allows for different variables to be controlled when testing flow characteristics of the fuel injector(s).

Operation of fuel injectors is typically controlled by an electronic solenoid valve of either low or high impedance type. The testing machine thus comprises a computerized electronic controller and a plurality of connectors sized and configured to connect to each fuel injector. Connection from the controller to the injectors, in most embodiments, through industry standard connectors (currently EV1, EV6 and EV14 types). The computerized electronic controller is programmable to modify voltage and/or current as well as duty cycle for application to the injector's solenoid. This further allows for more variables to be controlled when testing flow characteristics of the fuel injector(s) by the testing machine.

Control of the injectors (often called "firing" of the injectors) may vary among different types and brands of computerized injector controllers such as vehicle ECUs (electronic control units). In other words, there are slight differences in the electronic firing of fuel injectors depending on circuitry. Different diodes and transistors lead to different timing characteristics which impacts testing of the injectors. For example, major vehicle manufactures, as well as aftermarket ECU manufacturers all have slightly different circuits to open/close the injector, which is called an injector driver. In one embodiment, the testing machine comprises an electronic connector or interface which allows different physical modules to be connected to this electronic connector. These modules may be tuned to follow the driver circuitry for various ECUs for a particular manufacturer. The machine therefore allows connection of different physical modules depending on ECU to simulate and characterize the injectors. In another embodiment, these different modules may be different computer controlled programming instructions.

Figure 1B:
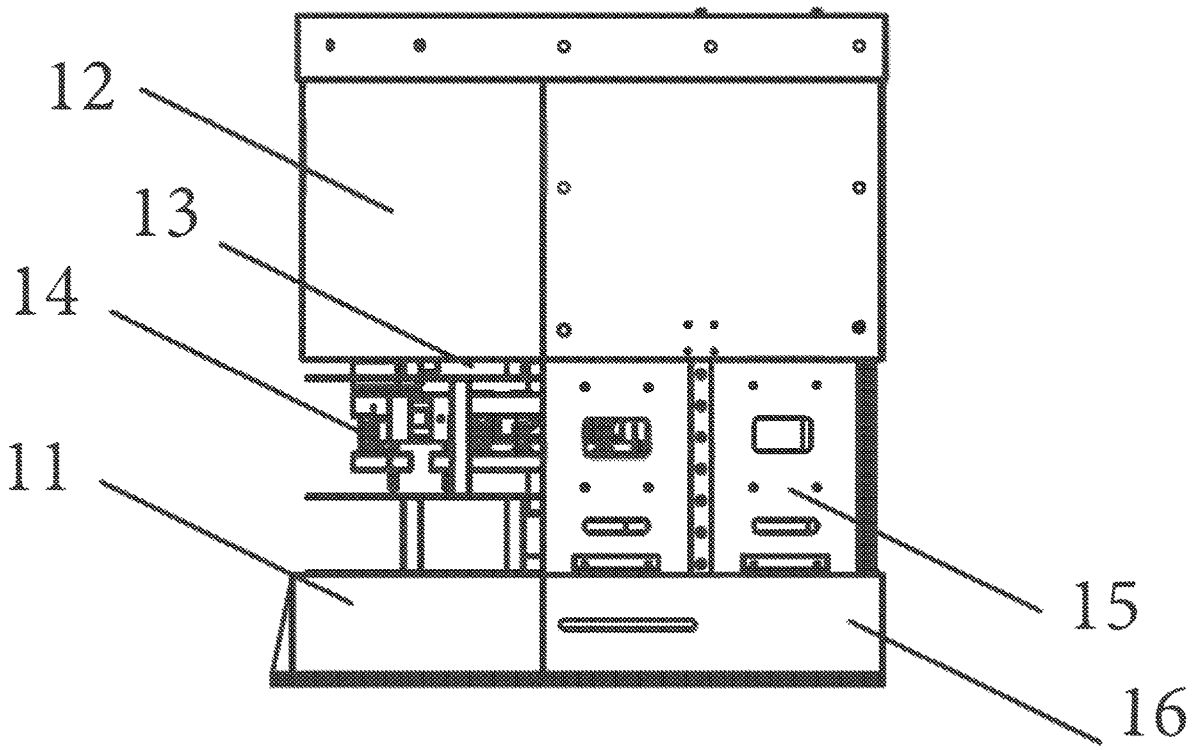
FIG. 1B provides a side view of an embodiment of the fuel injector testing machine.
Figure 1C:
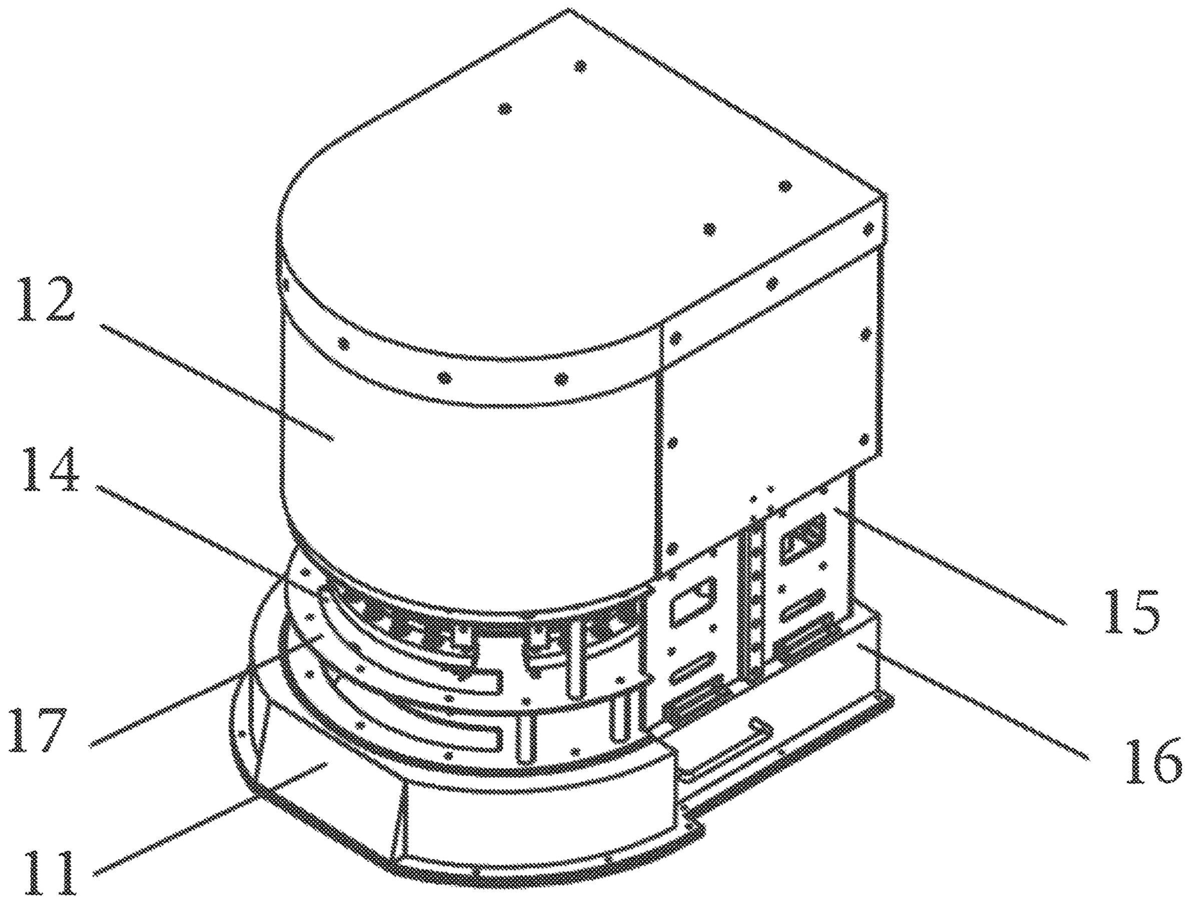
FIG. 1C provides a perspective view of an embodiment of the fuel injector testing machine.

Turning now to FIGS. 1A-1C, front, side and perspective views of the machine body are shown. The machine has a top body 12 and lower body 11 which contain machine components and a fluid reservoir. The head unit 13 can be seen engaged with fuel injectors held on a carousel 14. An openable drawer or cover 16 allows access to internal components. Side housing 15 covers components but allows certain access via apertures to reach adjustable elements. Guard track 17 is positioned outside of the carousel 14 to provide support and protection to the carousel and head unit 13. In operation, as discussed above, the head unit 13 causes fluid to flow through the fuel injectors that it is engaged with, measuring flow through said injectors. Adjustable flow parameters can provide for additional testing and evaluation. Once done, the head unit 13 disengages, and, in this embodiment, the carousel moves such that a different set of fuel injectors is aligned with the head unit. The head unit 13 then engages with these fuel injectors and the process is repeated.

Figure 2:
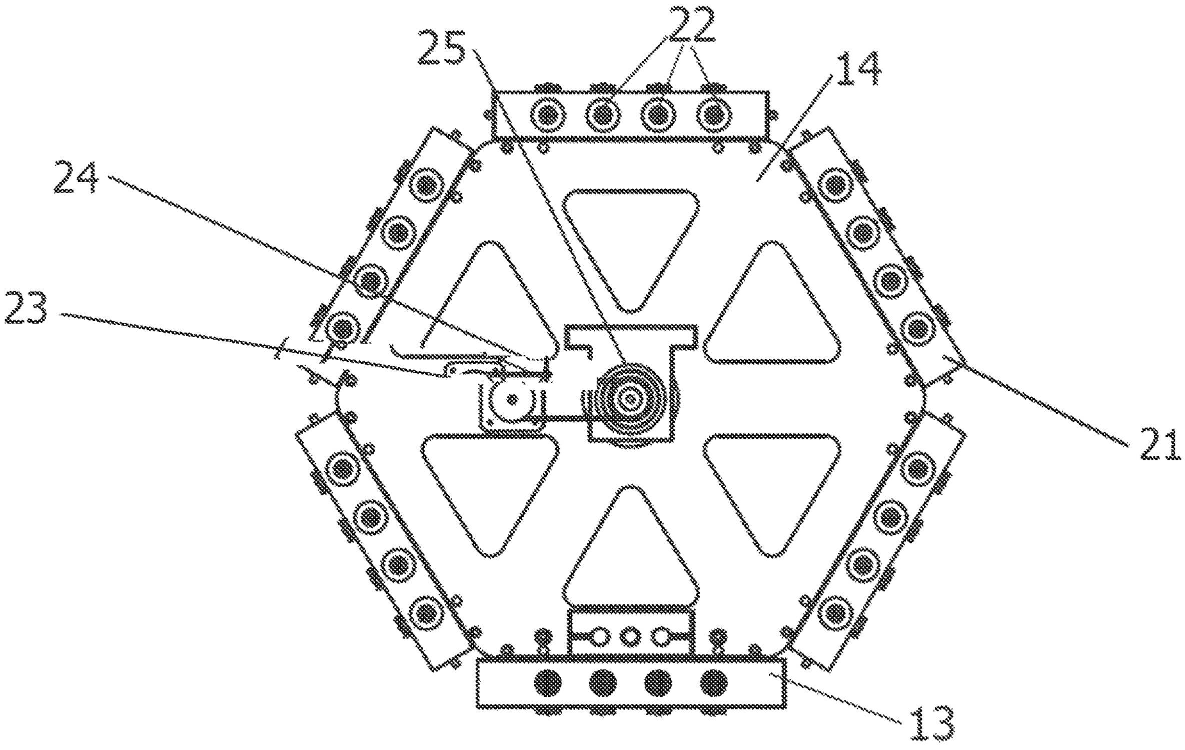
FIG. 2 provides an elevation view of an embodiment of components of the fuel injector testing machine.

FIG. 2 shows an elevation view of an embodiment of the carousel and head unit of the testing machine. The carousel 14 in this embodiment has a hexagon shape with six faces on which a row of fuel injectors may be held either directly or indirectly. Of course in other embodiments, different shapes may be used without straying from the scope of this invention. Head unit 13 has four fuel fittings engagable with cartridge fittings 33. The head unit 13 is shown positioned above a cartridge 21 having four fuel injectors 22 stored therein. A motor 23 uses a belt 24 to rotate wheel 25 which is connected to the carousel 14, and thereby allows for movement of the carousel 14 to bring a new set of the fuel injectors 22 into alignment with the head unit. In this embodiment, the fuel injectors 22 are stored on cartridge 21 which is attached to the carousel 14. In other embodiments, the fuel injectors 22 may be held directly to the carousel 14 via a connector allowing removable connection such as a clip, clamp, strap, slot, and the like.

Figure 3:
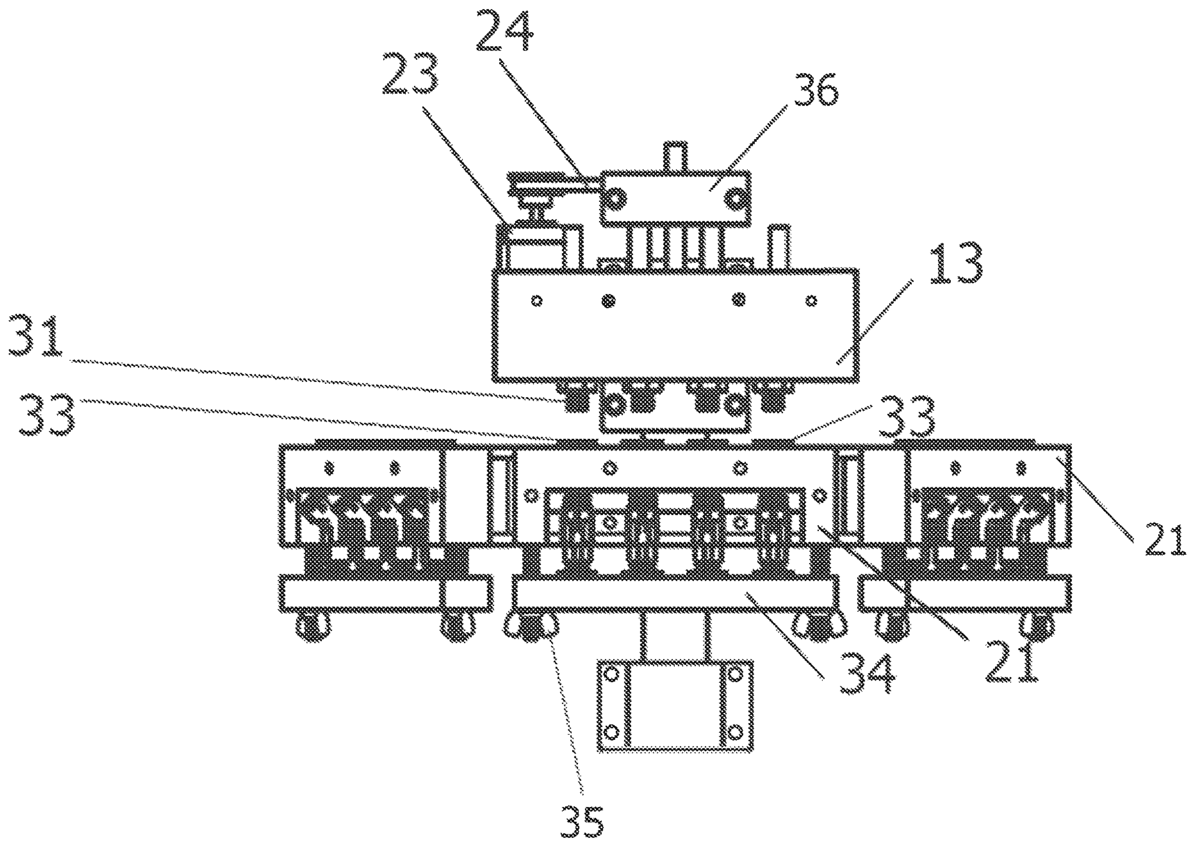
FIG. 3 provides a side view of another embodiment of components of the fuel injector testing machine.
Figure 4:
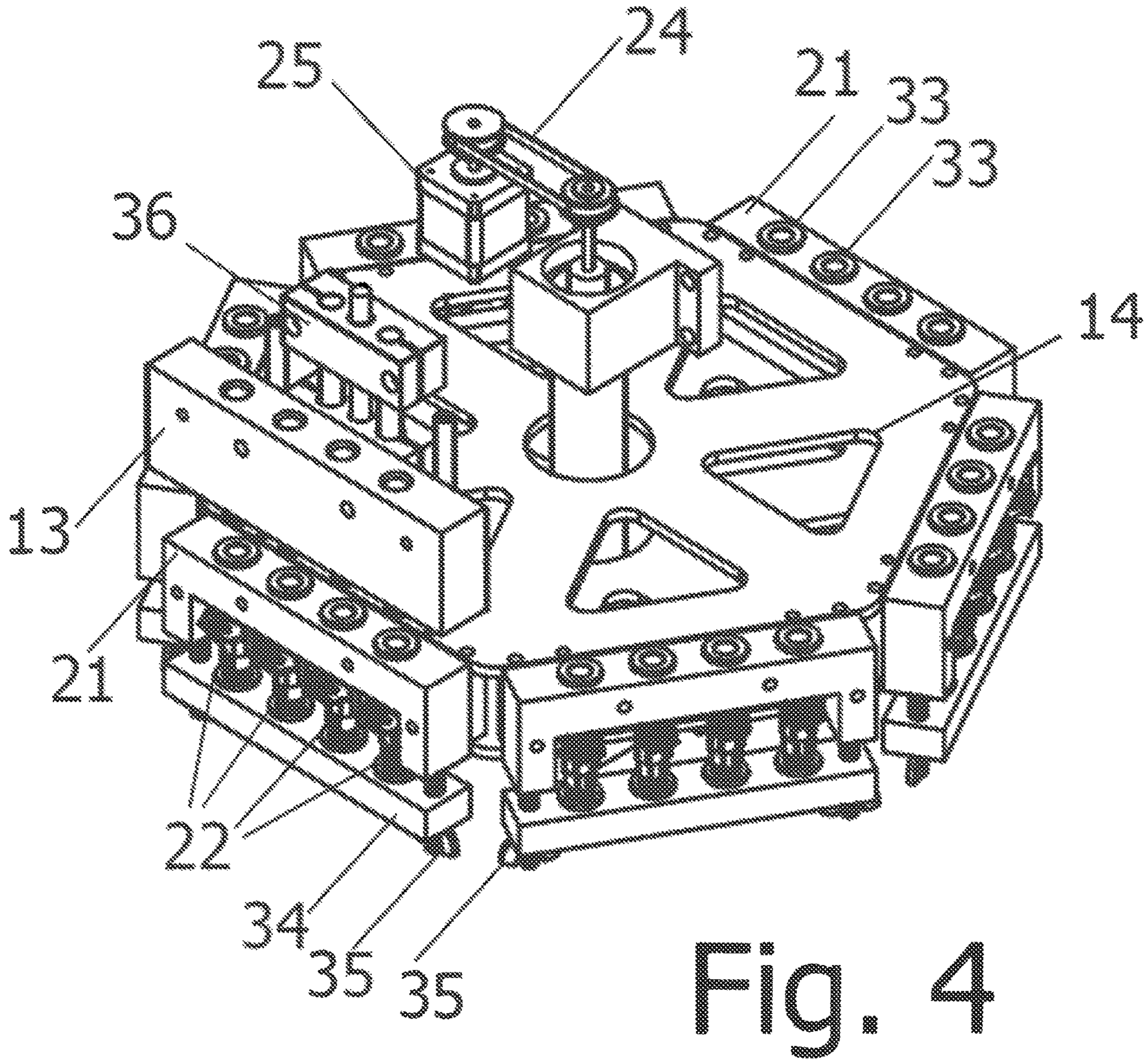
FIG. 4 provides a perspective view of still another embodiment of components of the fuel injector testing machine.
Figure 5:
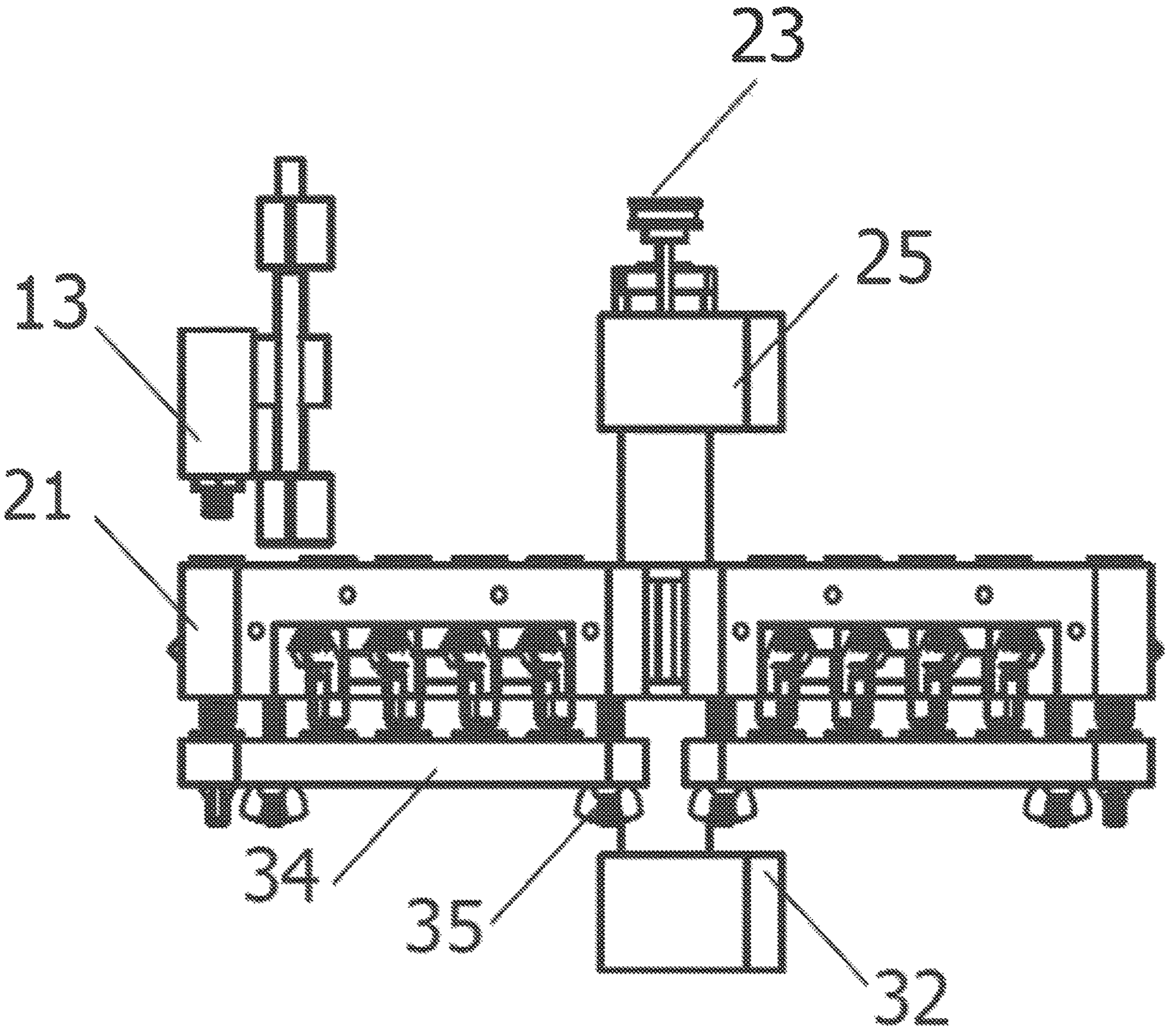
FIG. 5 provides a side view of yet another embodiment of components of the fuel injector testing machine.

FIGS. 3, 4, and 5 show side and perspective views of the carousel and head unit. The head unit 13 is movable by a stepper motor assembly 36 which uses a stepper motor, and a lead screw to move the head unit 13 towards and away from the carousel 14 to engage and disengage with the carousel 14 and fuel injectors 22 thereon. The head unit 13 has fluid connectors which allow heptane or other fluid to run through the head unit 13, through the flow meter(s) (not shown) therein, and through fuel fitting 31 which is engagable with corresponding fitting 33 on the cartridge 21. In this embodiment, the carousel 14 is supported by a thrust bearing 32 which allows rotation of a central post of the carousel 14. The cartridge 21 has a lower plate 34 which holds part of the fuel injectors. Wing nuts 35 engage with threaded shafts to allow for an adjustment of the position of the plate 34, to accommodate longer and shorter fuel injectors by the same cartridge 21. The head unit 13 can move to disengage with the carousel 14 to allow body rotation to then engage with a different set of fuel injectors 22 held, in this embodiment, in a cartridge 21.

In the embodiment of FIGS. 3-5, the carousel 14 may be rotated by, for example, a stepper motor which rotates the carousel 14. Of course, other rotational systems may be used as well. The thrust bearing 32 allows rotation of the central post of the carousel which extends beyond the carousel 14. Wires (not shown) such as injector wires to control the operation of the fuel injectors 22 run through this central shaft as well to the electronics which control injector operation during testing.

While several variations of the present disclosure have been illustrated by way of example in preferred or particular embodiments, it is apparent that further embodiments could be developed within the spirit and scope of the present disclosure, or the inventive concept thereof. However, it is to be expressly understood that such modifications and adaptations are within the spirit and scope of the present disclosure, and are inclusive, but not limited to the following appended claims as set forth. It is further to be understood that various features and elements of certain embodiments described herein may include elements, features, and/or components that are similarly and equally applicable to other aspects and embodiments, without being limited to the particular aspect or embodiment to which they are described.

What is claimed is:

1. A fuel injector testing machine comprising:

a head unit comprising a fluid inlet; and a fuel injector holding assembly connected to the head unit;

wherein the fuel injector holding assembly is operable to hold a plurality of fuel injectors;

wherein, the fuel injector holding assembly and the head unit are configured to move with respect to each other, between at least a first position and a second position;

wherein the head unit is configured to engage with and test a first subset in the plurality of fuel injectors at the first position, and a second subset in the plurality of fuel injectors at the second position.

2. The fuel injector testing machine of claim 1, wherein the first subset of fuel injectors is different from the second subset of fuel injectors.

3. The fuel injector testing machine of claim 1, wherein the fuel injector holding assembly is in a shape of a carousel.

4. The fuel injector testing machine of claim 1, wherein the head unit is configured to engage with and test a smaller number of fuel injectors than a count of the plurality of fuel injectors held by the fuel injector holding assembly.

5. The fuel injector testing machine of claim 1 further comprising a fitting in communication with the fluid inlet.

6. The fuel injector testing machine of claim 5 wherein the fitting forms a fluid outlet from the head unit.

7. The fuel injector testing machine of claim 6 further comprising a flow meter in communication with the fluid outlet.

8. The fuel injector testing machine of claim 7 wherein the flow meter is operable to measure a fluid flow through the fitting.

9. A fuel injector testing machine comprising:

a head unit comprising a fluid inlet; and a fuel injector holding assembly connected to the head unit;

wherein the fuel injector assembly is operable to hold a plurality of fuel injectors;

wherein, the fuel injector holding assembly and the head unit are configured to move with respect to each other, between at least a first position and a second position;

wherein the head unit is configured to engage with and test a first subset in the plurality of fuel injectors at the first position, and a second subset in the plurality of fuel injectors at the second position.

10. The fuel injector testing machine of claim 9 further comprising a computerized controller in communication with a solenoid valve of a first fuel injector in the plurality of fuel injectors and with a solenoid valve of a second fuel injector in the plurality of fuel injectors.

11. The fuel injector testing machine of claim 9 wherein at least one of the head unit and fuel injector holding assembly are movable in a reciprocating motion towards and away from the other of the fuel injector holding assembly and head unit to allow a plurality of fittings to engage and disengage with the plurality of fuel injectors held on the fuel injector holding assembly.

12. The fuel injector testing machine of claim 9 wherein the fuel injector holding assembly is one of a carousel, a conveyor, or a rack.

13. The fuel injector testing machine of claim 9 further comprising a fluid reservoir in communication with the fluid inlet.

14. The fuel injector testing machine of claim 9, wherein the first subset of fuel injectors is different from the second subset of fuel injectors.

15. The fuel injector testing machine of claim 9, wherein the head unit is configured to engage with and test a smaller number of fuel injectors than a count of the plurality of fuel injectors held by the fuel injector holding assembly.

16. The fuel injector testing machine of claim 9 further comprising a manifold.

17. The fuel injector testing machine of claim 16 further comprising a plurality of fittings in communication with the manifold.

18. The fuel injector testing machine of claim 17 wherein each of the plurality of fittings forms a fluid outlet from the head unit.

19. The fuel injector testing machine of claim 18 further comprising a flow meter in communication with the fluid outlet.

20. The fuel injector testing machine of claim 19 wherein the flow meter is operable to measure a fluid flow through at least one of the plurality of fittings.

* * * * *